United States Patent [19]

Pilatowicz et al.

[11] Patent Number: 4,926,556
[45] Date of Patent: May 22, 1990

[54] HAND HELD TRIMMER FOR CUTTING VEGETATION SUCH AS HEDGES AND THE LIKE

[75] Inventors: Edward A. Pilatowicz, Woodland Hills; Anthony Carsello, Chino; Richard Landy, Saugus, all of Calif.

[73] Assignee: Allegretti & Company, Chatsworth, Calif.

[21] Appl. No.: 356,613

[22] Filed: May 23, 1989

Related U.S. Application Data

[63] Continuation of Ser. No. 121,617, Nov. 17, 1987, abandoned.

[51] Int. Cl.⁵ ............................................. B26B 19/02
[52] U.S. Cl. ......................................... 30/216; 30/228
[58] Field of Search .................... 30/272, 272 R, 210, 30/216, 241, 277.4, 272.1; 464/86, 87, 97

[56] References Cited

U.S. PATENT DOCUMENTS

| D. 207,505 | 4/1967 | Whitmen . | |
|---|---|---|---|
| 1,489,658 | 4/1924 | Campbell | 30/216 |
| 1,937,586 | 12/1933 | Ortt | 30/11 |
| 2,268,221 | 12/1941 | Mischker | 30/228 |
| 2,537,122 | 1/1951 | Desmond | 64/29 |
| 2,564,032 | 8/1951 | Roberto | 30/216 |
| 2,633,636 | 4/1953 | Szostek | 30/216 |
| 3,347,062 | 10/1967 | Schumann | 64/28 |
| 3,429,639 | 2/1969 | Peters | 350/289 |
| 3,552,015 | 1/1971 | Batson | 30/216 |
| 4,185,381 | 1/1980 | Palmieri et al. | 30/347 |
| 4,281,504 | 8/1981 | Moore | 56/103 |
| 4,282,652 | 8/1981 | Balles, Sr. | 30/276 |
| 4,747,796 | 5/1988 | Iwai et al. | 464/97 X |

Primary Examiner—Douglas D. Watts
Attorney, Agent, or Firm—Lyon & Lyon

[57] ABSTRACT

A hand held trimmer for cutting heavy vegetation such as hedges or the like is disclosed. The trimmer includes a handle having a plurality of hand grips thereon. The handle includes mounting means for a conventional cutting means at one end and a convention motor at the other. The trimmer cutting and trimmer motor are preferably disposed at substantially opposite ends of the handle such that the weight of one substantially counterbalances the weight of the other. A resilient drive shaft means is disposed within the handle and extends between the motor to the reciprocating blade drive means so as to substantially avoid damaging the motor and the drive means should the trimmer reciprocating blades become temporarily jammed during operation. The handle preferably includes three grips positioned at the apices of a substantially inverted triangle such that the trimmer may be actuated using one hand on the lower grip or two hands on either the upper grips, or one of the upper grips in combination with the lower grip, so as to permit the operator to comfortably trim along a substantially horizontal, vertical, inclined or curvilinear surface.

8 Claims, 3 Drawing Sheets

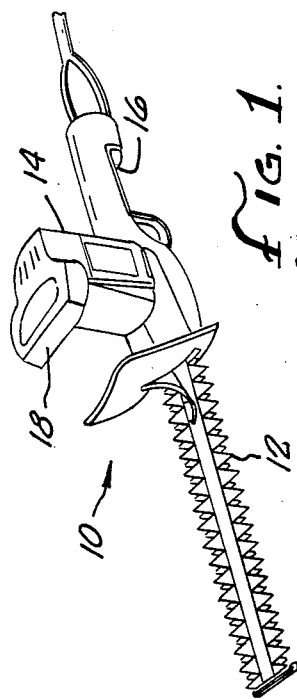
fig. 1.
PRIOR ART
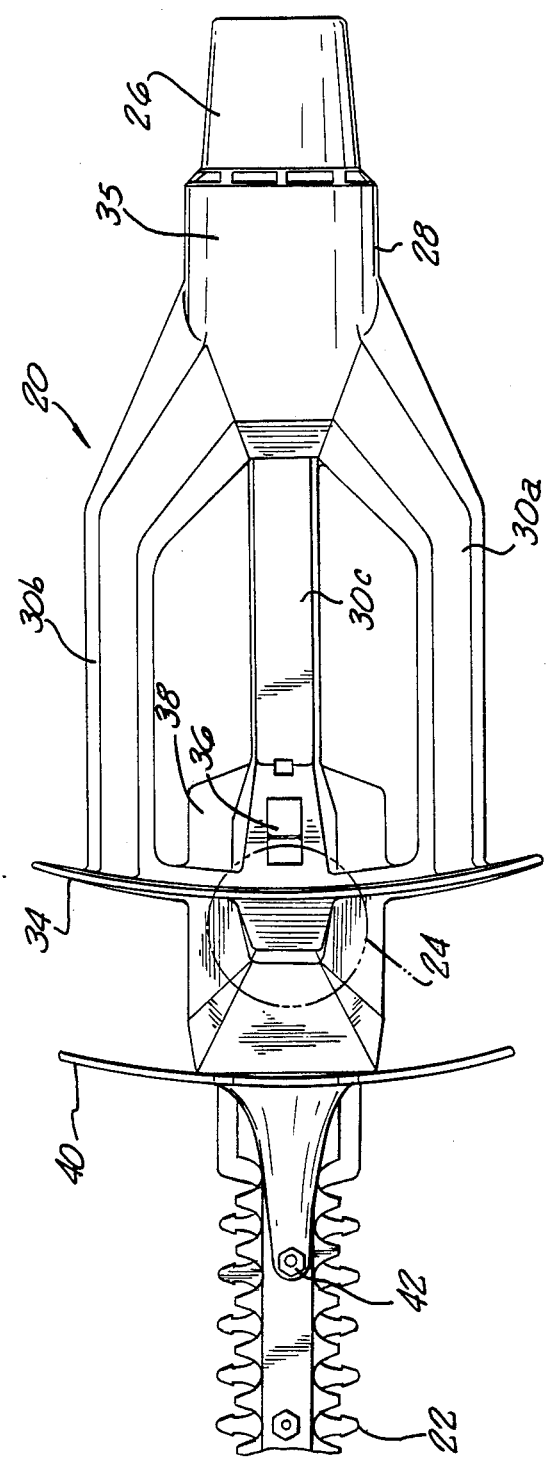
fig. 2.
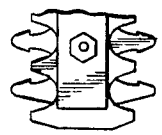

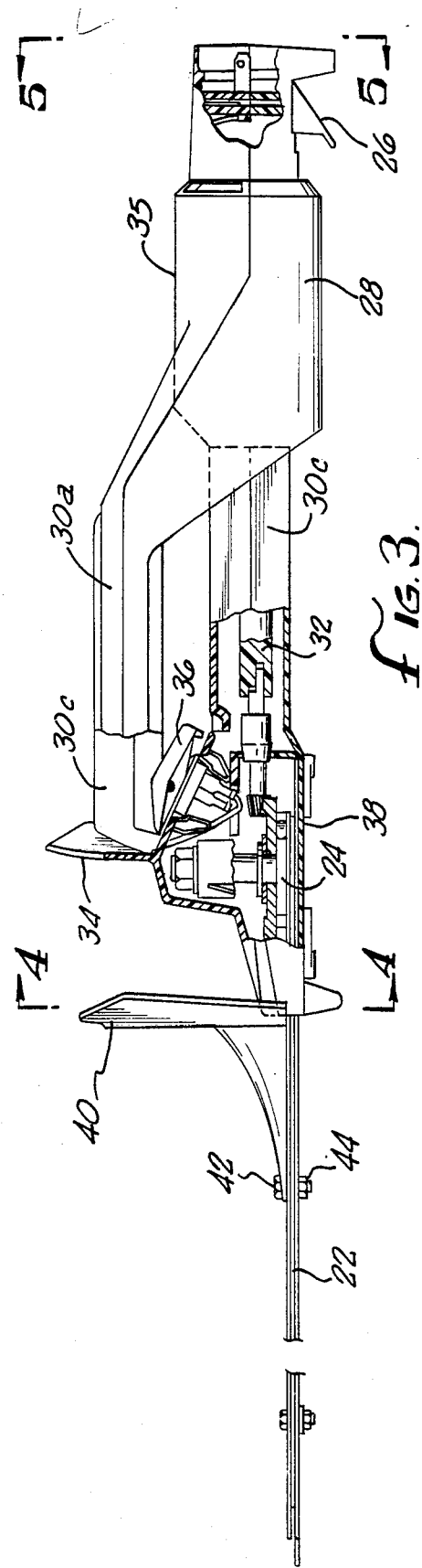
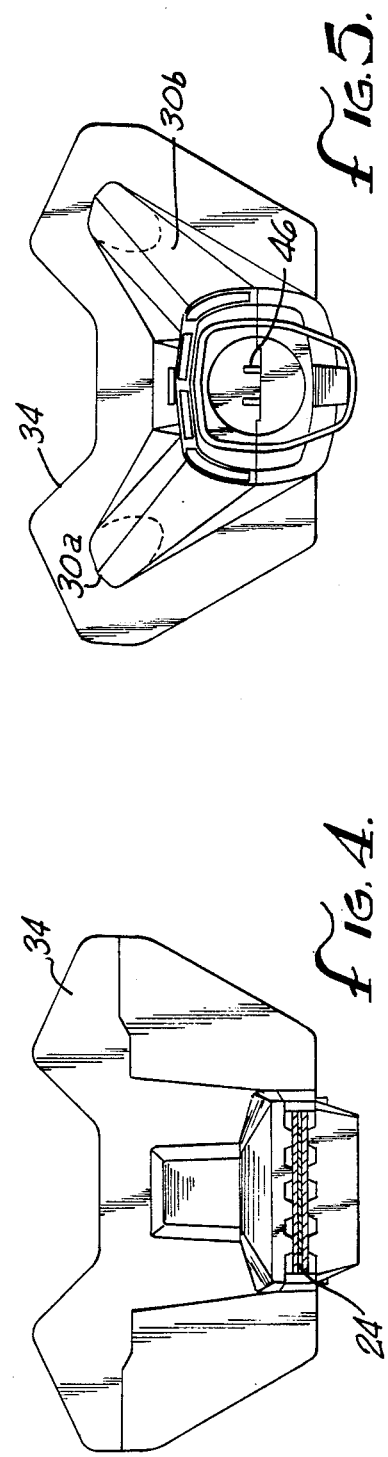

HAND HELD TRIMMER FOR CUTTING VEGETATION SUCH AS HEDGES AND THE LIKE

This is a continuation of co-pending application Ser. No. 121,617 filed on Nov. 17, 1987 now abandoned.

BACKGROUND OF THE INVENTION

The present invention relates to trimmers for trimming vegetation, and more particularly, to hand held trimmers for trimming vegetation such as hedges and the like.

Motorized trimmers for cutting heavy vegetation such as hedges and the like are widely recognized as being a great convenience to persons who trim such vegetation so as to provide the vegetation with an aesthetically pleasing appearance. Typically, these vegetation trimming devices include an engine or power source, which may be powered either electrically or through an internal combustion process, a handle apparatus and a cutting unit. Originally, such vegetation trimming devices included a one-sided reciprocating blade assembly and a drive mechanism or gear box which was in turn driven by the motor.

Presently, there is known in the art vegetation trimmers utilizing a two-sided reciprocating blade means. The two-sided blade means was an improvement to the user of these vegetation trimmers since it permitted the user to trim vegetation while guiding the cutting means in either direction across the surface of the vegetation. In addition, the interval between sharpening of the reciprocating blades can be increased if both sides of the two-sided reciprocating blade means are evenly used.

There are known in the art numerous commercially available vegetation trimmers having two-sided reciprocating cutting blades driven by an electric motor or an internal combustion engine. These vegetation trimmers typically have the cutting blade assembly and the motor positioned in close proximity to each other cantilevered off the forward end of the vegetation trimmer handle. This unbalanced arrangement requires the operator of the vegetation trimmer to support the cantilevered weight of both the motor and reciprocating blade assembly while using the trimmer, thus tiring the trimmer operator more quickly. Trimmers so arranged typically include a secondary handle so as to permit the operator to more comfortably use the trimming devices of the prior art. As such, these devices require the normal operator to hold the trimmer with both hands at all times in order to support this unbalanced configuration.

SUMMARY OF THE INVENTION

The present invention relates to a hand held trimmer for cutting heavy vegetation, such as hedges or the like, which includes a handle having a plurality of grips disposed between a motor and the blade assembly to provide a balanced trimmer. The components of the present invention are arranged such that the weight of the motor tends to counterbalance the weight of the cutting blade assembly and drive mechanism since each of these components is preferably mounted on substantially opposite ends of the handle of the present invention. A resilient drive shaft extends from the motor to the drive for actuating a conventional two sided reciprocating blade assembly. So constructed, a trimmer according to the present invention provides a well-balanced hand held trimmer which may be held and comfortably operated with either the right or left hand, or both hands, of the operator in a variety of positions depending upon whether the trimming device is being used to trim along a horizontal path, a vertical path, an inclined path or a curvilinear path. Moreover, through the utilization of a resilient drive shaft, the trimmer of the present invention is provided with a means to substantially avoid damaging the drive mechanism and the motor should the cutting device become temporarily jammed during operation.

Thus, it is an object of the present invention to provide an improved hand held trimmer.

Another object of the present invention is to provide a hand held trimmer for cutting heavy vegetation, such as hedges or the like, which is well-balanced such that the weight of the various major components counterbalance each other.

It is a further object of the present invention to provide a hand held trimmer for cutting heavy vegetation such as hedges or the like to provide means which will avoid substantial damage to either the drive means or the motor means should the cutting means become temporarily jammed during operation.

It is a further object of the present invention to provide a hand held trimmer for cutting heavy vegetation which may be conveniently and comfortably used and operated while trimming a horizontal, vertical, inclined or curvilinear surface. Other and more detailed objects of the present invention will become apparent to those skilled in the art upon examination of the disclosure contained herein.

BRIEF DESCRIPTION OF DRAWINGS

FIG. 1 is a perspective view of an example of a prior art device for trimming heavy vegetation such as hedges or the like;

FIG. 2 is a top view illustrating a preferred embodiment of a trimmer according to the present invention;

FIG. 3 is a side view of a preferred embodiment of a trimmer according to the present invention;

FIG. 4 is a front view of a preferred embodiment of the handle of a trimmer according to the present invention shown from substantially along line 4—4 of FIG. 3; and FIG. 5 is a rear view of a preferred embodiment of the handle of a trimmer according to the present invention shown from substantially along lines 5—5 of FIG. 3.

DETAILED DESCRIPTION OF THE PREFERRED EMBODIMENT

Figure 6:
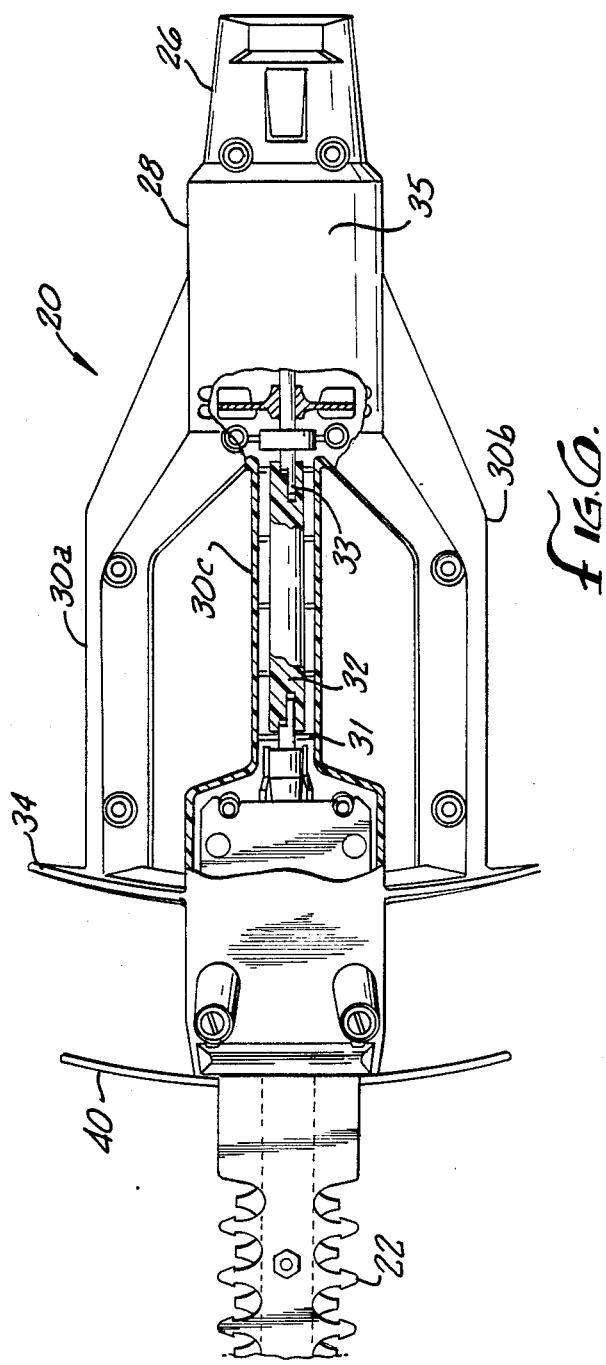
FIG. 6 is a bottom, partial cross-sectional view of a preferred embodiment of the handle of a trimmer according to the present invention.

As illustrated in FIG. 1, trimmers for trimming vegetation such as hedges or the like of the prior art typically include a double sided reciprocating cutting mechanism 12, a motor 14 and a handle 16. Because of the placement of the cutting mechanism 12 and the motor 14 in front of the handle 16, it is necessary to provide a secondary handle 18 to permit the user of the trimmer 10 to reasonably operate the device. As stated above, trimmers so configured include the disadvantage of virtually always requiring two hands to be used to hold the trimmer during use as well as requiring the user to support the weight of both the cutting mechanism 12 and the motor 14 which are disposed forward of the main handle means 16.

Turning to FIGS. 2-6, it is seen that the preferred embodiment of a hand held vegetation trimmer 20 for cutting hedges and the like of the present invention also includes a double-sided reciprocating cutting blade assembly 22, a drive mechanism 24, a motor 26 and a handle 28. In the preferred embodiment of the present invention, the handle 28 includes a plurality of hand grips 30 for use by the operator when handling the trimmer 20. As illustrated in the Figures, the grip members 30 are preferably arranged at the apices of a substantially inverted triangle such that the handle 28 includes two upper grip members 30a and 30b and one lower grip member 30c. The handle 28 is further provided with a forward portion 38 arranged to accept the mounting of the cutting blade assembly 22 and its accompanying drive mechanism 24. Similarly, a rear handle portion 35 is arranged to accept the mounting of the motor 26.

The driver mechanism 24 of the trimmer 20 of the present invention is preferably of the type well known in the art and forms no part of the present invention. Similarly, the motor 26 of the present invention is preferably an electrical motor of conventional design but may also be an internal combustion engine or a motor of other known variety. In the preferred embodiment an electrical plug 46 is mounted in the rear of the handle 28. Since the motor and drive mechanism are located at opposite ends of the handle, it is necessary to connect the two components together. It is desirable, however, to provide a drive connection means which will substantially inhibit or prevent damage to either of these components should the reciprocating cutting blade assembly 22 become temporarily jammed during operation. Such could happen, for example, if the trimmer blades encounter a large branch or the like. Accordingly, the trimmer 20 of the present invention preferably includes a resilient drive shaft 32 connecting the motor 26 and the drive mechanism 24, which drive shaft is preferably disposed within grip 30c. This drive shaft 32 is preferably constructed from a resilient material such as Nylon. Referring to FIG. 6, the resilient drive shaft 32 is connected at one end to drive mechanism shaft 31 and at its opposite end to motor shaft 33. During operation, should the cutting blade assembly 22 become jammed or engage an object which otherwise impacts a sudden shock to the trimmer 20, the shock is transmitted to the resilient drive shaft 32 which absorbs the shock without transmitting it to the motor. So arranged, the drive shaft 32 is able to absorb a sudden shock should the cutting blade assembly 22 become jammed on a branch or the like, thereby avoiding serious permanent damage to either the reciprocating cutter drive assembly 24 or the motor 26.

A first guard shield 34 may also be provided between the forward grips 30 and the rearward end of the cutting blade assembly 22 so as to prevent the operator's hands from inadvertently slipping off the hand grips 30 and into the cutting blades. Where the motor means 26 is an electrical motor, toggle switch 36 is preferably provided for turning the trimmer on and off. In a preferred embodiment of the invention, the first guard shield 34 is formed as an integral part of handle 28. A second guard shield may also be provided between the first guard shield 34 and the cutting blade assembly 22. As shown in FIG. 3, the second guard shield 40 is removably mounted on the rear of the cutting blade assembly by means of bolt 42 and nut 44.

When constructed in accordance with the teachings of the present invention, the weight of the motor 26 will act to offset the weight of the cutting means 22 and drive means 26 so as to provide the trimmer with an excellent longitudinal balance; that is, the trimmer is well balanced from front to back. In addition, the plurality of hand grips in conjunction with the excellent balance of the present trimmer provides the operator with the option of operating the trimmer with one hand or two hands. Moreover, the disposition of the hand grips 30a-c are in a substantially inverted triangular shape provides the operator better control over the trimming device when the trimmer is used to cut along a horizontal, vertical, inclined or curvilinear surface since the operator may grasp the trimmer either by the lower grip member, the two upper grip members, or some combination of the two.

From the foregoing, it is seen that the hand operated trimmer of the present invention incorporates a simple, durable and easily manufactured structure having a balanced relationship between its various components while providing a plurality of grip members for increasing the ease with which trimming may be accomplished along a horizontal, vertical, inclined or curvilinear surface.

Although the invention has been described primarily with respect to one embodiment, it will be apparent to those skilled in the art that other embodiments of the present invention are possible. Thus, the scope of the present invention is limited only the scope of the appended claims.

We claim:

1. A hand held trimmer for cutting heavy vegetation such as hedges and the like, comprising:
   a handle, said handle including a plurality of hand grips;
   a cutting means, said cutting means being connected to said handle;
   a motor means, said motor means being connected to said handle, said motor means and said cutting means being disposed at substantially opposite ends of said handle and arranged with respect to said handle so as to substantially counterbalance each other; and
   resilient drive means, said drive means extending between said motor means and said cutting means and being sufficiently resilient for driving said cutting means so as to substantially avoid damaging said motor means should said cutting means become jammed during operation,
   wherein said handle has one lower hand grip and two upper hand grips and said hand grips are positioned substantially at the apices of an inverted triangle.

2. A trimmer as set forth in claim 1 wherein said resilient drive shaft means is disposed within said lower hand grip.

3. A hand held trimmer for cutting heavy vegetation such as hedges and the like, comprising:
   a handle, said handle including a plurality of hand grips;
   a cutting means, said cutting means being connected to said handle;
   a motor means, said motor means being connected to said handle, said motor means and said cutting means being arranged with respect to said handle so as to substantially counterbalance each other;
   resilient drive means, said drive means extending between said motor means and said cutting means and being sufficiently resilient for driving said cutting means so as to substantially avoid damaging said motor means should said cutting means become jammed during operation;

a first shield guard longitudinally positioned between said hand grips and said cutting means; and a second shield guard longitudinally positioned between said first shield guard and said cutting means.

4. In a hand held trimmer for trimming heavy vegetation such as hedges and the like, the trimmer including motor means and cutting means having a gear box means, the improvement comprising:

a handle, said handle extending between the motor means and the cutting means and being arranged such that the weight of the cutting means and the weight of the motor means substantially counterbalance each other, said handle having a plurality of hand grips thereon; and resilient drive shaft means, said drive shaft being disposed within said handle and arranged to transmit power from the motor means to the cutting means gear box and being sufficiently resilient to avoid damaging the motor means and the gear box means should said cutting means become jammed during operation, wherein said handle has three hand grips thereon and wherein said hand grips are positioned substantially at the apices of a triangle.

5. A hand held trimmer as set forth in claim 4 wherein said handle has two upper hand grips and one lower hand grip.

6. In a hand held trimmer for trimming vegetation such as hedges and the like, the improvement comprising:

a handle, a first portion of said handle being arranged to mount a cutting means, a second portion of said handle being arranged to mount a motor means, said handle including a plurality of hand grips extending between said first handle portion and said second handle portion, said first and said second portions being offset such that the weight of the cutting means substantially counterbalances the weight of the motor means at said hand grips, wherein a resilient drive shaft is disposed within one said hand grip and is arranged to be attached in driving engagement to a motor means at one end, a cutting means at the other end and sufficiently resilient to avoid permanent damage to the motor means should the cutting means become jammed during operation.

7. A hand trimmer as set forth in claim 6 wherein a guard shield extends from said handle and longitudinally positioned between said grips and the first portion of said handle.

8. A hand trimmer as set forth in claim 7 wherein a second guard shield is positioned between said first guard shield and the cutting means.

* * * * *